United States Patent
Engel et al.

(10) Patent No.: US 11,156,553 B2
(45) Date of Patent: Oct. 26, 2021

(54) SYSTEMS AND METHODS FOR OPTICAL RESONANCE IMAGING

(71) Applicant: The University of Chicago, Chicago, IL (US)

(72) Inventors: Gregory S. Engel, Flossmoor, IL (US); Marco Alberto Allodi, Chicago, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 16/181,738

(22) Filed: Nov. 6, 2018

(65) Prior Publication Data
US 2019/0137393 A1 May 9, 2019

Related U.S. Application Data

(60) Provisional application No. 62/582,598, filed on Nov. 7, 2017.

(51) Int. Cl.
  *G01N 21/63* (2006.01)
  *G01J 3/28* (2006.01)
  (Continued)

(52) U.S. Cl.
  CPC ............. *G01N 21/63* (2013.01); *G01J 3/024* (2013.01); *G01J 3/10* (2013.01); *G01J 3/2823* (2013.01);
  (Continued)

(58) Field of Classification Search
  CPC .......... G01J 11/00; G01J 3/024; G01J 3/2823; G01J 2003/1213; G01J 3/10; G01J 3/2889;
  (Continued)

(56) References Cited

U.S. PATENT DOCUMENTS

| 8,395,780 B2* | 3/2013 | Brixner | G01J 5/041 356/452 |
| 8,665,446 B2* | 3/2014 | Brixner | G01J 3/433 356/451 |

(Continued)

OTHER PUBLICATIONS

Marco A. Allodi, Peter D. Dahlberg, Richard J. Mazuski, Hunter C. Davis, John P. Otto, and Gregory S. Engel, "Optical Resonance Imaging: An Optical Analog to MRI with Subdiffraction-Limited Capabilities," ACS Photonics 2016 3 (12), 2445-2452, DOI: 10.1021/acsphotonics.6b00694 (Year: 2016).*

(Continued)

*Primary Examiner* — Violeta A Prieto
(74) *Attorney, Agent, or Firm* — Bell & Manning, LLC

(57) ABSTRACT

An optical resonance imaging system includes a light emitting device to emit laser pulses onto a subject. The laser pulses include a first pulse and a second pulse to place the subject in an excited state. The laser pulses also include a third pulse to stimulate emission of one or more third order signals from the subject. The system also includes a spectrometer to receive the one or more third order signals and to generate spectrum signals commensurate with intensities of the one or more third order signals. The system may further include circuitry configured to analyze the spectrum signals, generate one or more images of the subject based on the analysis, and construct one or more maps of positions of the subject based on the one or more images.

18 Claims, 6 Drawing Sheets

(51) Int. Cl.
| | |
|---|---|
| *G01J 3/10* | (2006.01) |
| *G01J 3/443* | (2006.01) |
| *G01J 3/42* | (2006.01) |
| *G01J 3/02* | (2006.01) |
| *G01J 11/00* | (2006.01) |
| *G01J 3/12* | (2006.01) |

(52) U.S. Cl.
CPC ............... *G01J 3/2889* (2013.01); *G01J 3/42* (2013.01); *G01J 3/443* (2013.01); *G01J 11/00* (2013.01); *G01N 21/636* (2013.01); *G01J 2003/1213* (2013.01); *G01N 2201/06113* (2013.01)

(58) Field of Classification Search
CPC . G01J 3/42; G01J 3/443; G01N 21/63; G01N 2201/06113; G01N 21/636
See application file for complete search history.

(56) References Cited

U.S. PATENT DOCUMENTS

| | | | | |
|---|---|---|---|---|
| 9,001,320 | B2* | 4/2015 | Harel | G01J 3/10 |
| | | | | 356/300 |
| 9,673,908 | B2* | 6/2017 | Marpaung | H04B 10/07955 |
| 10,274,310 | B2* | 4/2019 | Hunt | G01N 21/636 |
| 10,928,188 | B2* | 2/2021 | Hunt | G01J 3/108 |
| 2011/0141467 | A1* | 6/2011 | Brixner | G01J 3/433 |
| | | | | 356/323 |
| 2011/0157594 | A1* | 6/2011 | Brixner | G01J 5/041 |
| | | | | 356/451 |
| 2013/0222801 | A1* | 8/2013 | Harel | G01J 3/453 |
| | | | | 356/328 |
| 2016/0142148 | A1* | 5/2016 | Marpaung | H04B 10/07955 |
| | | | | 398/38 |
| 2018/0034227 | A1* | 2/2018 | Trull-Silvestre | H01S 3/0057 |
| 2018/0180404 | A1* | 6/2018 | Hunt | G01J 3/108 |
| 2019/0212132 | A1* | 7/2019 | Hunt | G01N 21/636 |
| 2019/0259146 | A1* | 8/2019 | Hunt | G02F 1/353 |
| 2021/0131797 | A1* | 5/2021 | Hunt | G01J 3/10 |

OTHER PUBLICATIONS

Wan, Y.; Gao, Z.; Zhu, T; Yan, S.; Johnson, J. and Huang, L., "Cooperative singlet and triplet exciton transport in tetracene crystals visualized by ultrafast microscopy," *Nat. Chem.*, 2015, 7, pp. 1-22. (Includes Supplemental Information).

Nate, S.; Spokoyny, B.; Stoumpos, C.; Soe, C. M. M.; Kanatzidis, M.; and Harel, E., "Spatially segregated free-carrier and exciton populations in individual lead halide perovskite grains," *Nat. Photonics*, May 2017, vol. 11, pp. 285-289.

Hell, S.W. and Wichmann, J., "Breaking the diffraction resolution limit by stimulated emission: stimulated-emission-depletion fluorescence microscopy," *Opt. Lett.*, Jun. 1, 1994, vol. 19, No. 11, pp. 780-782.

Klar, T.A. and Hell, S. V.,"Subdiffraction resolution in far-field fluorescence microscopy," *Opt. Lett.*, Jul. 15, 1999, vol. 24, No. 14, pp. 954-956.

Klar, T.A., Jakobs, S., Dyba, M., Egnerk, A. and Hell, S.W., "Fluorescence microscopy with diffraction resolution barrier broken by stimulated emission," *Proceedings of the National Academy of Sciences USA*, Jul. 18, 2000, vol. 97, No. 15, pp. 8206-8210.

* cited by examiner

| Parameter | Value | Parameter | Value |
|---|---|---|---|
| $g_{sp}$ | 500 nm a) | $\tau_s$ | 15 fs |
| $\theta_{in}$ | 0.74 rad b) | $W_{f,FWHM}$ | 814 nm |
| $\theta_{out}$ | 1.18 rad b) | $z_{obs}$ | 210 μm |
| $\psi$ | $\pi/2 - 0.74$ rad | optical aperture (collection) | $f/2$ |
| $\phi$ | $\pi/2 + 1.18$ rad | spatial stepsize | 5 nm |
| $\lambda_0$ | 800 nm | temporal stepsize | 10 as |
| $w(0)$ | 5 mm | $d$ | 1 Debye |
| $R(0)$ | $10^8$ mm | | |
| $\tau_i$ | 15 fs | | |
| optical aperture | $f/0.5$ | | |
| $d_1 = f$ of $l_1$ | 125 mm c) | | |
| $d_2 = f$ of $l_2$ | 100 mm c) | | |
| $d_3 = f$ of $l_3$ | 25 mm c) | | |

FIG. 5

SYSTEMS AND METHODS FOR OPTICAL RESONANCE IMAGING

CROSS-REFERENCE TO RELATED APPLICATION

The present application claims the priority benefit of U.S. Provisional Patent App. No. 62/582,598 filed on Nov. 7, 2017, the entire disclosure of which is incorporated herein by reference.

This invention was made with government support under grant number DMR1420709 awarded by the National Science Foundation, grant number FA9550-41-D-0367 awarded by the United States Air Force Office of Scientific Research and grant numbers N00014-15-1-0048, N00014-16-1-2513 awarded by the Department of Defense Advance Research Projects Agency. The government has certain rights in the invention.

BACKGROUND

Spectroscopy generally refers to the measurement and analysis of spectra that are produced when matter interacts with or emits electromagnetic radiation. Spectroscopy can be linear or non-linear. In linear spectroscopy, a light-matter interaction occurs responsive to a single incident radiation field, and the interaction is treated as a linear response between the incident radiation and the matter. In non-linear spectroscopy, a multiple light-pulse sequence excites a subject to generate third order signals that are recovered to describe atomic and/or molecular structures, interactions and relaxation, and kinetics and dynamics of the subject.

SUMMARY

An illustrative optical resonance imaging system includes a light emitting device to emit laser pulses onto a subject. The laser pulses include a first pulse and a second pulse to place the subject in an excited state. The laser pulses also include a third pulse to stimulate emission of one or more third order signals from the subject. The system also includes a spectrometer to receive the one or more third order signals and to generate spectrum signals commensurate with intensities of the one or more third order signals. The system may further include circuitry configured to analyze the spectrum signals, generate one or more images of the subject based on the analysis, and construct one or more maps of positions of the subject based on the one or more images.

An illustrative optical resonance imaging method includes emitting, by a light emitting device, a first pulse and a second pulse onto a subject to place the subject in an excited state. The method also includes emitting, by the light emitting device, a third pulse onto the subject to stimulate emission of one or more third order signals from the subject. The method also includes receiving, by a spectrometer, the one or more third order signals from the subject. The method also includes generating, by the spectrometer, spectrum signals commensurate with intensities of the one or more third order signals. The method also includes analyzing, by circuitry in communication with the spectrometer, the spectrum signals, generating one or more images of the subject based on the analysis, and constructing one or more maps of positions of the subject based on the one or more images.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a table of parameter values for an experiment conducted with the optical resonance imaging system in accordance with an illustrative embodiment.

DETAILED DESCRIPTION

Figure 1:
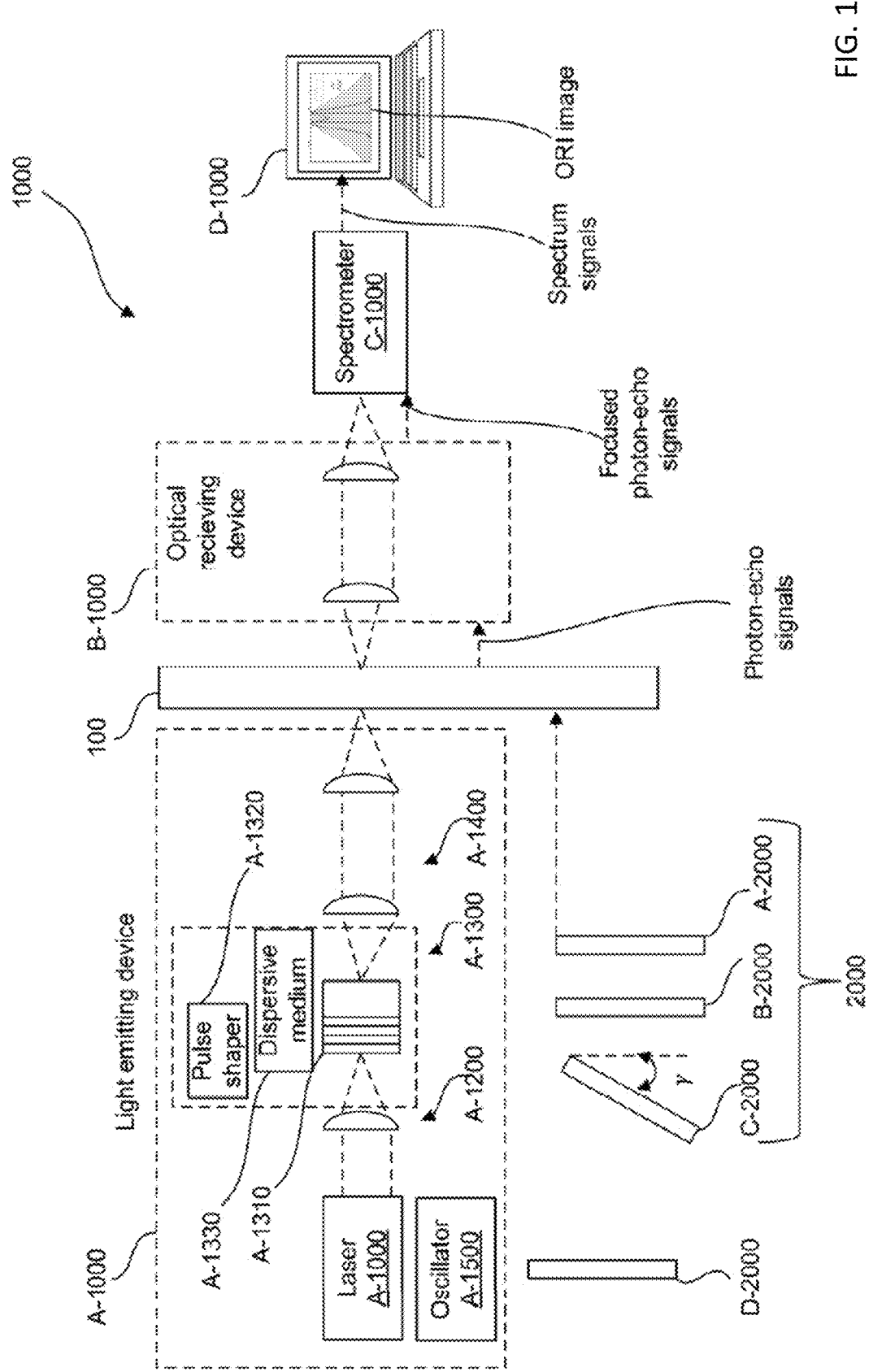
FIG. 1 is a schematic view of an optical resonance imaging (ORI) system in accordance with an illustrative embodiment.

In traditional spectroscopy, optical devices relying on transient absorption (TA) (e.g., TA microscopes) are often used to determine molecular structure, interactions and relaxation, and kinetics and dynamics of a subject at a nanosecond time-scale resolution. These conventional TA microscopes use two laser pulses to produce images. The first pulse excites the subject, and the second probes the subject. Conventional TA microscopes have designs analogous to any laser-based microscope, and by using femtosecond laser pulses, they can extract time information. However, the ability of these conventional TA microscopes is limited to point-by-point measurements, meaning that data can only be acquired at one spot at a time, and the subject must be raster scanned to produce an image.

Some conventional optical apparatuses rely on stimulated-emission depletion (STED) and use two laser pulses, one to excite the subject, and another toroidal-shaped pulse to deplete excitations from the larger laser spot. The remaining excitation is emitted from a smaller spot than the diffraction limit, thus generating super-resolution.

Other conventional optical apparatuses rely on fluorescence-based super-resolution techniques, such as Photo-Activated Localization Microscopy (PALM) or Stochastic Optical Reconstruction Microscopy (STORM), which use spatial information from different emitters collected at different times to produce a super-resolution image. However, the conventional apparatuses relying on fluorescence-based techniques cannot generate super-resolution images with femtosecond temporal resolution because fluorescence occurs on a nanosecond timescale. Other conventional apparatuses rely on near-field techniques, like Near-field Scanning Optical Microscopy (NSOM), which must perform raster scanning measurements over different positions at different times to build up an image from individual points.

Described herein are optical resonance imaging (ORI) methods and systems which overcomes the aforementioned limitations in traditional imaging. More specifically, described herein is an optical resonance imaging system that includes a light emitting device to emit laser pulses on a subject, where the laser pulses include a first pulse and a second pulse to place the subject in an excited state, and a third pulse to stimulate emission of third order signals. The system also includes a spectrometer to receive the third order signals and provide spectrum signals commensurate with intensities of the excitement signals. The system further includes circuitry configured to receive the spectrum signals, analyze the spectrum signals, and generate maps of atomic positions of the subject based on the images. As used herein, 'third order signals' can refer to photon echo signals (i.e., rephasing signals) and/or free induction decay signals (i.e., non-rephasing signals).

The proposed ORI system inherently uses a wide-field technique, allowing for the acquisition of multiple data points at once. As such, points within the image are coherent, which prevents artifacts that result from point-by-point collection. A wide-field technique also collects more points in a single measurement. Additionally, by relying on three laser pulses to investigate the subject, the ORI system is capable of producing a spectrum at every point. Such a feature provides more information about the spectral dynamics than conventional TA microscopes since it allows for resolution of the pump frequency.

The proposed ORI system also utilizes pulse front tilt in at least one laser, and generates super-resolution images that are not limited by the diffraction of the optics, as in conventional TA microscopes. As such, the ORI system is able to map a lateral spatial coordinate of the subject to the emission time of the signal, and the ultrashort character of the tilted pulse at the subject ensures that the emission of a third order signal will occur at different times.

Figure 2:
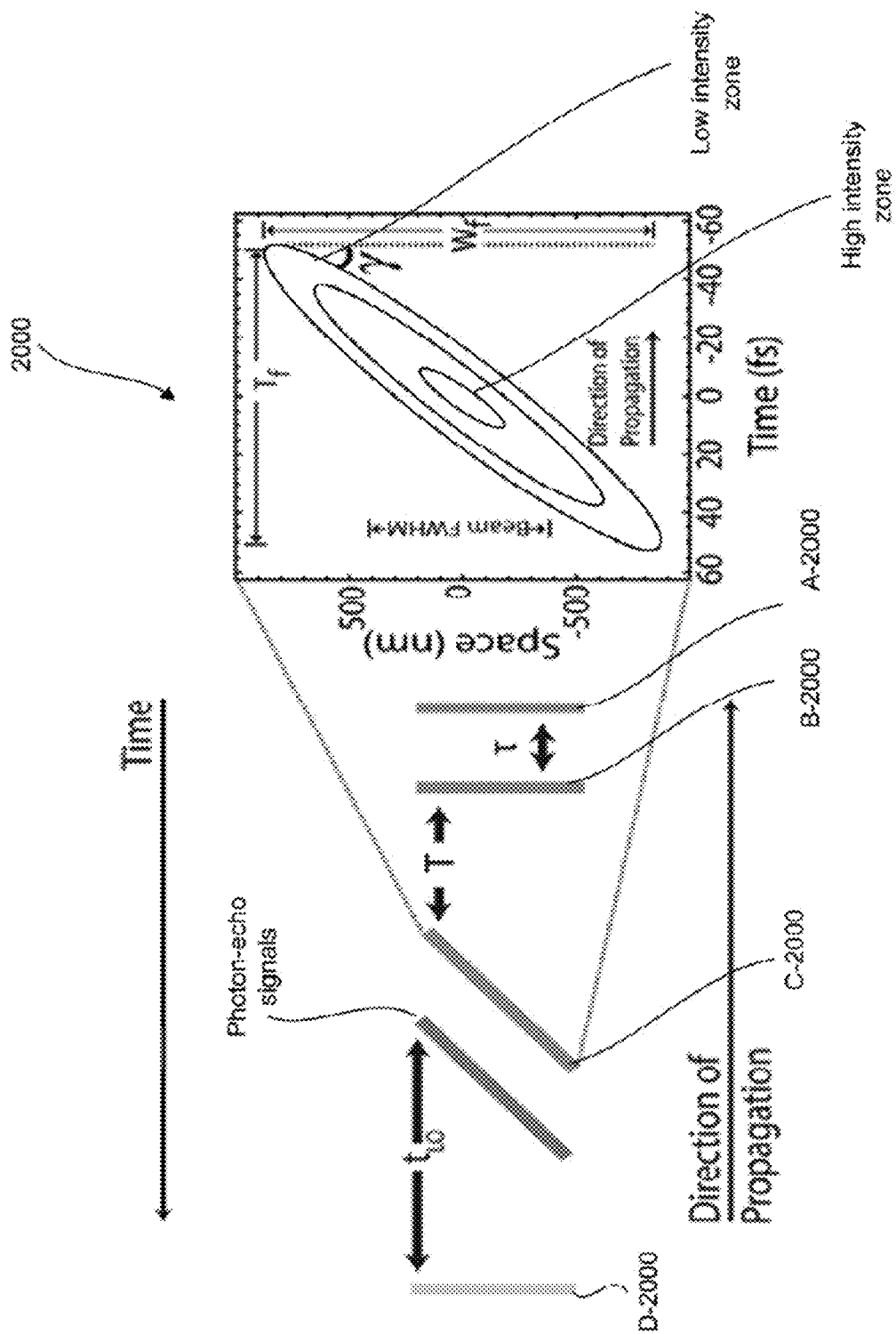
FIG. 2 is a schematic view of laser pulses of the ORI system in accordance with an illustrative embodiment.
Figure 3:
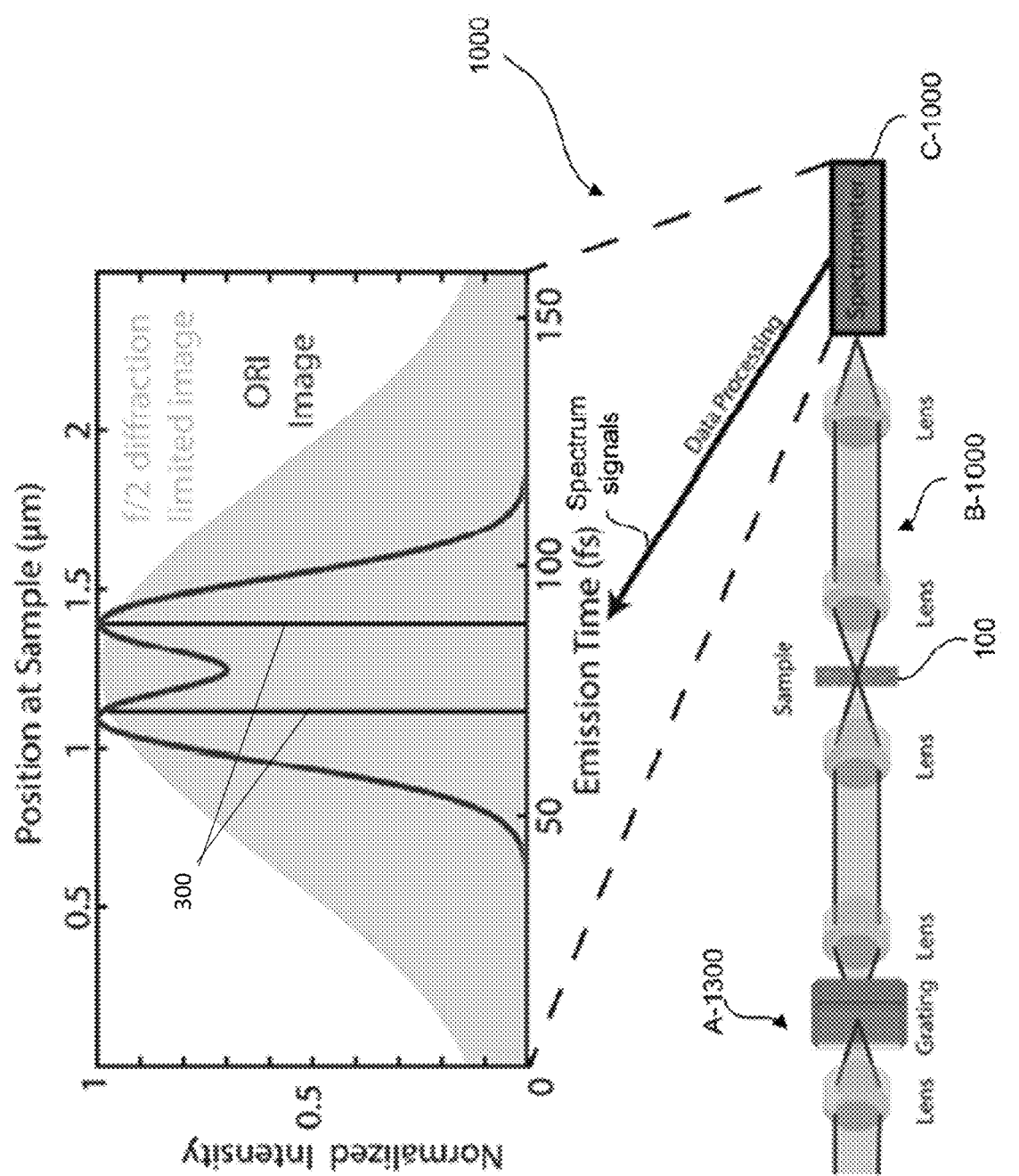
FIG. 3 is a schematic view of an ORI image and a diffraction image generated by the ORI system in accordance with an illustrative embodiment.

Referring now to the drawings, wherein like reference numerals designate identical or corresponding parts throughout the several views, FIG. 1 is a schematic view of an optical resonance imaging (ORI) system 1000 in accordance with an illustrative embodiment. FIG. 2 is a schematic view of laser pulses of the ORI system in accordance with an illustrative embodiment. FIG. 3 is a schematic view of an ORI image and a diffraction image generated by the ORI system in accordance with an illustrative embodiment.

The ORI system 1000 emits laser pulses 2000 toward a subject 100 and generates ORI images based on responses to the emitted laser pulses 2000. In an illustrative embodiment, the ORI system 1000 maps positions of atoms, molecules or defects in the subject 100 with laser pulses 2000 to provide molecular structure, interactions and relaxation, and kinetics and dynamics of the subject 100 with a femtosecond or nanosecond time-scale resolution.

The ORI system 1000 includes a light emitting device A-1000 that sends laser pulses 2000 to the subject 100, an optical receiving device B-1000 that receives focused third order signals generated by the subject 100 in response to the laser pulses 2000, and a spectrometer C-1000 that receives the focused third order signals and provides spectrum signals commensurate with intensity of the third order signals. The ORI system 1000 also includes circuitry D-1000 that receives and analyzes the spectrum signals to provide ORI images and diffraction-limited images (FIG. 3) commensurate with positions of atoms, molecules, or defects of the subject 100.

In an illustrative embodiment, the laser pulses 2000 include a first pulse A-2000, a second pulse B-2000, and a third pulse C-2000. The first pulse A-2000 and the second pulse B-2000 place the subject 100 in an excited state while the third pulse C-2000 stimulates optical emission of the third order signals. In another illustrative embodiment, the first pulse A-2000 and the second pulse B-2000 can be substantially non-tilted and separated by a time τ.

The third pulse C-1000 can be separated from the second pulse B-2000 by a time T and is characterized by a pulse-front tilt, which hits different parts of the subject 100 at different times to have the third order signals emitted from these different parts at different times. The time difference between the third order signals imposed by the pulse-front tilt of the third pulse C-2000 provides information commensurate with the positions of the atoms, molecules or aspects of the material of the subject 100.

In addition, the pulse front tilt has an angle γ and a focused spot size $W_f$ of the intensity front of the third pulse C-1000, as illustrated in FIG. 2. The angle γ can be between 60° and 90°, and preferably between 70° and 90°, and more preferably between 80° and 90°, with a grating A-1310 having a line density between 1000 lines/mm and 4000 lines/mm and an incident angle between 20° and 80°. In alternative embodiments, different angles and/or line densities may be used.

The timing between the first pulse A-2000, the second pulse B-2000, and the third pulse C-2000 (i.e., τ and T) can provide a complete measurement of the ORI images and a degree of freedom unavailable in conventional microscopy apparatuses (e.g., in pump-probe microscopy).

The light emitting device A-1000 includes a laser A-1100 to generate the laser pulses 2000, pre-grating optics A-1200 to receive the incident beam and generate a focused incident beam, an optical tilt system A-1300 to receive the focused incident beam and generate angular dispersion, and post-grating optics A-1400 to receive and focus the angular dispersion on the subject 100. It is known that angular dispersion and pulse-front tilt are Fourier conjugates, meaning that angular dispersion that exists in the position-frequency domain is pulse front tilt in the position-time domain.

In addition, the light emitting device A-1000 includes a local oscillator A-1500 that emits local oscillator pulses (LO) D-2000 that are used by the spectrometer C-1000 and/or the circuitry D-1000 as reference pulses to measure arrival time differences $t_{LO}$ between the third order signals and the local oscillator pulses (LO) D-2000 via software instructions executed by the circuitry D-1000.

The pre-grating optics A-1200 and the post-grating optics A-1400 can be any set of focusing optics that focuses the incident beam and the angular dispersion such as lenses, focusing mirrors, one or more microscope objectives, etc. As one example, the post-grating optic A-1400 can be a 4f imaging configuration.

The optical tilt system A-1300 can be any optical device that receives the focused incident beam and generates a pulse front tilt. For example, the optical tilt system A-1300 can be a grating A-1310, a series of gratings, grisms, and/or prisms that can generate angular dispersion, or virtually-imaged phased array (VIPA), and/or an etalon.

Alternatively, the optical tilt system A-1300 can include a pulse shaper A-1320 that generates spatial chirp beams and a dispersive medium A-1330 to receive the spatial chirp beams (e.g., a glass prism) and generate the pulse-front tilt of the third pulse C-2000. The pulse shaper and the dispersive medium generates the pulse front tilt via the product of spatial-chirp and group-delay dispersion. Spatial chirp can also be generated by first creating angular dispersion and then using focusing optics (e.g., a lens or other focusing optic) to collimate the generated beam.

The first pulse A-2000 and the second pulse B-2000 are separated by the time period τ and prepare a population state that evolves for the waiting time T. The third pulse C-2000 stimulates emission of the third order signals from the subject 100. Since the third pulse C-2000 has significant pulse-front tilt, different parts of the subject 100 will emit the third order signals at different times. In FIG. 2, the right portion of the figure shows a plot of the calculated spatial and temporal extent of the third pulse C-2000 with pulse-front tilt, focused at the sample using f/0.5 optics. The contours are plotted for the pulse intensity. A representative phase front of the third pulse C-2000 is illustrated by the dashed black line, the angle γ defines the pulse-front tilt, $W_f$ is the focused spot size, and $T_f$ is the length swept out by the pulse-front tilt. At the focus, the Full Width Half Maximum (FWHM) of the tilted pulse in the direction of propagation is substantially equal to 15 fs, the same as for the first pulse A-2000 and the second pulse B-2000. In alternative embodiments, a different FWHM may be used.

In FIG. 3, the calculated ORI image and a diffraction-limited image are illustrated. The ORI image is in thick solid lines, with the dipole source positions identified with thin solid lines. The difference in the peak centers returns the spacing of the emitters. The diffraction-limited image of a set of individual, incoherent emitters located at the positions of the thick solid lines and imaged with f/2 optics is shown in the filled trace behind. The bottom portion of the figure shows an optical system that generates the ORI signals.

In an illustrative embodiment, the disclosed ORI system 1000 can be a direct optical analog of a magnetic resonance imaging (MRI) device. The proposed pulse sequence for ORI maps space to time and recovers an image from a heterodyne-detected nonlinear third order measurement. As opposed to traditional third order signal measurements, the third pulse C-2000 in the laser pulses 2000 has significant pulse-front tilt that acts as a temporal gradient. This gradient couples space to time by stimulating the emission of a third order signal from different lateral spatial locations of the subject 100 at different times, providing widefield ultrafast microscopy. As discussed above, as used herein the term 'third order signals' can refer to photon echo signals (i.e., rephasing signals) and/or free induction decay signals (i.e., non-rephasing signals).

The diffraction limit of the optics in the system is circumvented by mapping the lateral spatial coordinate of the subject 100 with the emission time of the third order signal, which can be measured to high precision using interferometric heterodyne detection. This technique is thus an optical analog of MRI, where magnetic-field gradients are used to localize the spin-echo emission to a point below the diffraction limit of the radio-frequency wave used. The ORI signals are calculated using the laser pulses 2000 having approximatively 15 fs pulses and the third pulse having approximatively 87° of pulse-front tilt, collected using f/2 optics and find a two-point resolution of approximatively 275 nm using approximatively 800 nm light that satisfies the Rayleigh criterion. A general equation for resolution in optical resonance imaging that indicates how super-resolution imaging using this technique is derived below. The third order signals also enable spectroscopic determination of the input and output energy. The technique thus correlates the input energy with the final position and energy of the exciton.

Two key concepts from ultrafast nonlinear spectroscopy enable ORI measurements—the stimulated emission of a third order signal, and interferometric heterodyne detection. A third order signal results from a third-order nonlinear optical process. Three separate interactions of the subject 100 with an optical electric field (in this case, three laser pulses A-2000, B-2000, and C-2000) generate a polarization, $P^{(3)}(\tau, T, t_R)$, in the material that emits a signal, $E^{(3)}_{sig}$, where τ is the time between the first pulse A-2000 and the second pulse B-2000, T is the time between the second pulse B-2000 and the third pulse C-2000, and $t_R$ is the time after the third pulse C-2000 interacts with the subject 100. Third-order perturbation theory ultimately shows that $P^{(3)}(\tau, T, t_R)$ is the time-ordered convolution of the material response function, $R^{(3)}(\tau, T, t_R)$, with the three laser pulses (the first pulse A-2000, the second pulse B-2000, and the third pulse C-2000) that interact with the subject 100 at different times. In the impulsive limit, where the laser pulse duration is much shorter than the timescale of the dynamics of interest, the laser pulses 2000 can be thought of as delta functions, yielding a direct measurement of the response function. The third order response can be isolated experimentally from other contributions to $E^{(3)}_{sig}(t)$ by using a phase-matching geometry of the input beams that selects for the rephasing Liouville space pathways.

Beams with pulse front tilt have a non-separable coupling between space and time that results in the intensity front of the beam having an angle relative to the phase front. FIG. 2 shows the calculated intensity profile focused at the subject 100 position of a beam that has pulse front tilt, with γ the angle between the pulse-front and the phase front. The electric field of a beam containing pulse front tilt can be written as $E(x, t) = E_x(x)E_t(t-px)$, where $E_x$ is the spatial component in a direction perpendicular to the direction of propagation, $E_t$ is the temporal component, and p is the coupling term representing pulse front tilt. Thus, the arrival time of the electric field is also a function of the position along the beam. When a laser pulse with pulse front tilt is incident on a subject 100, different parts of the pulse interact with different parts of the subject 100 at different times. This can be thought of as a time-dependent local spot size that sweeps across the diffraction-limited, time-integrated focal spot.

The pulse sequence used for ORI can be seen in FIG. 2. The pulse order and phase-matching condition can be similar or identical to a third order pulse sequence used in 2D electronic or infrared spectroscopy. The ORI pulse sequence differs from the sequence used for a conventional third order in that the first pulse A-2000 and the second pulse B-2000 have no pulse front tilt, while the third pulse C-2000 that stimulates the coherent emission and generates the third order signal has a large angle of pulse front tilt. The pulse front tilt of the third pulse ensures that emission from different parts of the subject 100 is stimulated at different times. This approach introduces a coupling between space and time into the third-order response of the system such that $R^{(3)}(\tau, T-px, t_R)$.

To make this coupling between space and time possible, one must deliver a pulse with pulse front tilt to the subject 100 and have it retain its ultrashort character. One way to generate pulse front tilt can be found by considering Equation (1) below and use of the Fourier transform of both space and time:

$$\iint dx\, dt\, E_x(x)E_t(t-px)e^{i\omega t}e^{ik_x x} = \int dx\, E_x(x)E(\omega)e^{-i\omega px}e^{ik_x x} = E(k_x - p\omega)E(\omega), \quad (1)$$

In Equation (1), two uses of the shift theorem of Fourier analysis have been used. It is apparent that $d\omega/dk = p$, which is closely related to angular dispersion, $d\theta_0/dk = p/k_0$, where $\theta_0$ is defined as the propagation angle. The angular dispersion gained by a beam after diffracting off of a grating will generate pulse front tilt when that beam is re-imaged. Experimental results in the literature have shown that when the grating generating the third pulse C-2000 is appropriately imaged, the imaged pulse retains its femtosecond character across its entire focal spot. Pulse front tilt can also be generated from the product of spatial chirp and group velocity dispersion in a beam.

Figure 6:
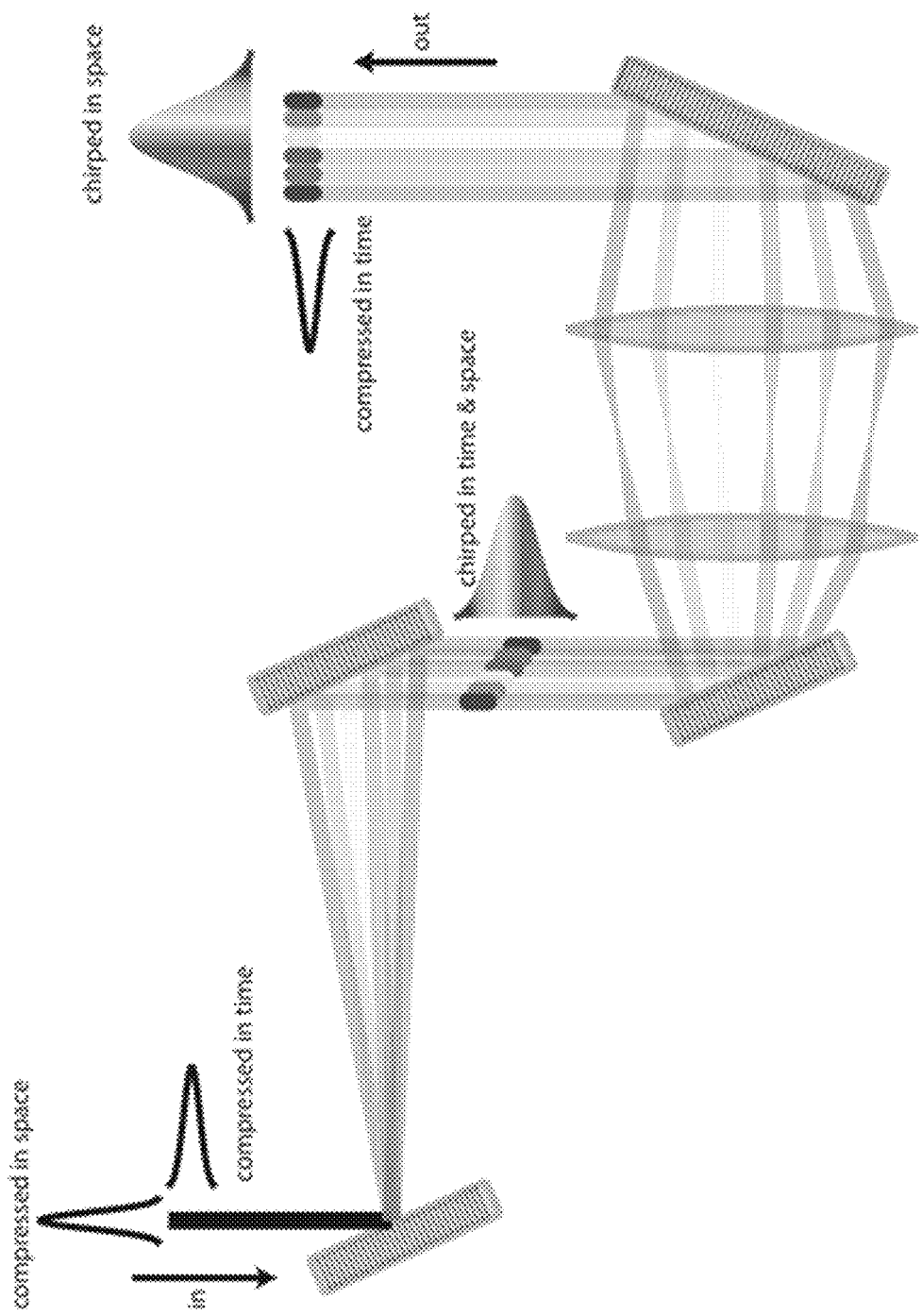
FIG. 6 depicts use of half of an optical compressor and half of an optical stretcher to create spatial chirp without temporal chirp, thereby ensuring, when focused onto the sample, an ultrafast duration of the third laser pulse with a pulse front tilt in accordance with an illustrative embodiment.

In another embodiment, an optical tilt system of the light emitting device includes one half or a whole optical compressor and one half or a whole optical stretcher to ensure a femtosecond duration of the third pulse with pulse front tilt. FIG. 6 depicts use of half of an optical compressor and half of an optical stretcher to create spatial chirp without temporal chirp, thereby ensuring, when focused onto the sample, an ultrafast duration of the third laser pulse with a pulse front tilt in accordance with an illustrative embodiment. In one embodiment, a whole optical stretcher and a whole optical compressor are used. Alternatively, a one half optical stretcher and a one half optical compressor may be used as shown in FIG. 6. As used herein, an ultrafast duration can refer to any amount of time value between 1 femtosecond and 999 picoseconds.

In one embodiment, the tilted beam profile of the third pulse C-2000 is calculated at the focus of an image-producing optical system by propagating a Gaussian beam through an optical system calculated using the Kostenbauder extension to ray-transfer matrices. The result is shown in the right portion of FIG. 2.

The Kostenbauder matrices allow one to follow spatio-temporal couplings as a beam propagates through an optical system. Traditional ray-transfer linear algebra involves two-dimensional vectors (containing position and angle) and 2×2 ABCD matrices that represent the operations performed by different optical elements. Kostenbauder extended this analysis to include frequency and time using 4-dimensional vectors and a 4×4 matrix as shown in Equation (2) below:

$$\begin{pmatrix} x \\ \theta \\ t \\ f \end{pmatrix}_{out} = \begin{pmatrix} A & B & 0 & \frac{\partial x_{out}}{\partial f_{in}} \\ C & D & 0 & \frac{\partial \theta_{out}}{\partial f_{in}} \\ \frac{\partial t_{out}}{\partial x_{in}} & \frac{\partial t_{out}}{\partial \theta_{in}} & 1 & \frac{\partial t_{out}}{\partial f_{in}} \\ 0 & 0 & 0 & 1 \end{pmatrix} \begin{pmatrix} x \\ \theta \\ t \\ f \end{pmatrix}_{in} = \begin{pmatrix} A & B & 0 & E \\ C & D & 0 & F \\ G & H & 1 & I \\ 0 & 0 & 0 & 1 \end{pmatrix} \begin{pmatrix} x \\ \theta \\ t \\ f \end{pmatrix}_{in}, \quad (2)$$

where A,B,C,D are defined in the same way as in the 2×2 ray transfer matrices.

A Gaussian beam can be propagated through an optical system where the optical elements are represented by these matrices and the explicit inclusion of frequency and time enable calculations of beams with spatio-temporal coupling. The pulse plotted in FIG. 2 was calculated by starting with an initial beam radius of 5 mm, and a 15 fs FWHM pulse centered at 800 nm. A focusing optics matrix transformation allows one to calculate the beam spot at the grating position. A grating with 2000 lines/mm and an incident angle of 42° was used to generate angular dispersion in the calculated field. This calculated electric field was propagated through an optical system that included two focusing optics spaced by the sum of their focal lengths, and the result shows that an ultrashort tilted pulse can be delivered to the focus of an optical system. The third pulse C-2000 can only be focused down to the diffraction limit, denoted as $W_f$ in FIG. 2. However, the pulse-front tilt ensures that sub-diffraction-limited parts of the third pulse C-2000 will interact with the subject 100 at different times. The interference between different colors incident from different angles generates a transform-limited pulse over a sub-diffraction limited area.

Since the angle of pulse front tilt, $\gamma$, is defined as the angle of the intensity front of the third pulse C-2000 with respect to the phase fronts, $\gamma$ can be calculated from the beam profile shown in FIG. 2 via the inverse tangent. Thus, $$\gamma = \tan^{-1}\left(\frac{T_f * c}{W_f}\right) = 87°,$$

where $W_f$ and $T_f$ are labeled in FIG. 2, and correspond to the size of the focused spot and the time it takes the beam to sweep over that spot respectively. In the above relation, c is the speed of light. The successful encoding of space into the time-dependent polarization, $P^{(3)}(\tau, T-px, t_R)$, in the subject 100 ensures that different parts of the subject 100 will emit a third order signal at different times. The three time intervals upon which $P^{(3)}$ depends result from the different arrival times of three independent ultrafast pulses. Thus, in addition to the spatial information, $P^{(3)}$ also contains all the spectral information that is contained in a measurement such as 2D electronic spectroscopy assuming that all time intervals are scanned.

Interferometric heterodyne detection of the signal field, $E^{(3)}_{sig}$, measures the precise arrival time of the third order signals compared to the local oscillator pulses (LO) D-2000 of the local-oscillator A-1500. As in 2DES, a set of optics, often in a 4f imaging configuration, collect the emitted signal and focus both the third order signals and the local oscillator pulses (LO) D-2000 into the spectrometer C-1000. The spectrometer C-1000 converts the time-domain signals into the frequency domain and the resultant interference pattern between the LO and the signal is measured on a square-law detector. The frequency-domain signal on the detector can be expressed in Equations 3-5, as follows:

$$S(\omega) = \int_{-\infty}^{\infty} dt (E_{LO}(t-t_{LO}+\phi) + E^{(3)}_{sig}(t)) e^{i\omega t}|^2, \quad (3)$$

$$S(\omega) = |e^{i\omega t_{LO}+\phi} E_{LO}(\omega) + E^{(3)}_{sig}(\omega)|^2, \quad (4)$$

$$S(\omega) = I_{LO} + I_{sig} + 2E^{(3)}_{sig}(\omega) E_{LO}(\omega) \cos(\omega t_{LO}+\phi), \quad (5)$$

where $\phi$ is the phase difference between $E^{(3)}_{sig}$ and $E_{LO}$, and the shift theorem of Fourier analysis is used to go from Equation (3) to Equation (4). If $\phi$ is nonzero, it can be set to zero through a phasing procedure in post-processing of the data. The order of operations, a Fourier transform followed by taking the absolute square, reflects the experimental detection process, and $I_{LO}$ and $I_{sig}$ are the intensity of the LO and the signal pulses, respectively. The $I_{sig}$ contribution is weak enough that it does not contribute to the measured signal, and $I_{LO}$ produces a constant signal that can be removed experimentally in a variety of ways. Lock-in detection can remove this contribution, as can filtering in the conjugate Fourier domain (the time domain) of the signal, $t_\omega$. In this domain, $I_{LO}$ can be seen as interference between $E_{LO}$ with itself, and this homodyne process appears at time $t_\omega=0$. The measured interference between $E_{LO}(\omega)$ and $E^{(3)}_{sig}(\omega)$ is modulated by the difference in arrival time between the LO and the signal, and appears at time $t_\omega=t_{LO}$. As such, this interference pattern generates a direct measurement of the time between the LO and the signal. In addition, as long as $t_{LO}$ is greater than zero, the final term in Equation (5) that contains the information about the third-order molecular response of the subject 100 can be isolated.

In an optical resonance imaging measurement, interferometric heterodyne detection allows discrimination between arrival times of signals from different parts of the subject 100. Repeating the same mathematical analysis above for a signal with pulse front tilt results in Equations 6 and 7 below:

$$S(\omega)=|\int_{-\infty}^{\infty} dt(E_{LO}(t-t_{LO})+E^{(3)}{}_{sig}(t-px))e^{i\omega t}|^2, \quad (6)$$

$$S(\omega)=I_{LO}+I_{sig}+2E^{(3)}{}_{sig}(\omega)E_{LO}(\omega)\cos(\omega(t_{LO}+px)), \quad (7)$$

where φ is assumed to be substantially null.

The value $E_{LO}(\omega)$ is simply the amplitude at a given frequency, and it can be found from the measurement of $I_{LO}$, since $I_{LO}=|E_{LO}(\omega)|^2$. Using this information in combination with the simplification of $S(\omega)$ discussed above, the signal that contains the spatial information can be written as Equation 8:

$$S(\omega)=2E^{(3)}{}_{sig}(\omega)\cos(\omega(t_{LO}+px))=2E^{(3)}{}_{sig}(\omega)\cos(\omega px), \quad (8)$$

where in the last step $t_{LO}=0$. In an ORI measurement, $t_{LO}$ represents the difference in arrival time between the local oscillator pulses (LO) D-2000 and the start of the tilted signal pulse as shown in FIG. 2. Since $t_{LO}$ can be thought of as a constant phase, it can be substantially equal to zero.

Generating the final image can be accomplished with a final Fourier transform of Eqn. (8) back to the time domain, resulting in Equations 10-12:

$$S_{image}(t)=\int_{-\infty}^{\infty} d\omega E^{(3)}{}_{sig}(\omega)(e^{i\omega px}+e^{-i\omega px})e^{i\omega t}, \quad (10)$$

$$S_{image}(t)=E^{(3)}{}_{sig}(t+px)+E^{(3)}{}_{sig}(t-px), \quad (11)$$

$$S_{image}(t)-=E^{(3)}{}_{sig}(t-px), \quad (12)$$

where $S_{image}(t)-$ corresponds to one side of the time axis generated by the Fourier transform. The other side of the axis can be ignored since it contains identical information because the signal field is a real valued function. Thus, the spatial information encoded into the signal can be extracted from the measured experimental data. Since the bandwidth of the transition that generates $E^{(3)}{}_{sig}$ is not infinite, it can impose a fundamental limit on the resolution of the instrument.

To assess the feasibility of this approach, the electric field emitted by a finite number of point emitters was simulated. The subject 100 was divided into 5 nm blocks. Each block represents a dipole (e.g., a collection of molecules or atoms) that interacts with the first pulse A-2000 and the second pulse B-2000, placing the system in an excited state from which the third pulse C-2000 generates the third order signals. The size of the illuminated area is determined by $W_f$ from FIG. 2, as the spot size of the first pulse A-2000 and the second pulse B-2000 can be set to be larger than $W_f$. The magnitude of a third order signal $E^{(3)}{}_{sig}$ scales as shown in Equation 13:

$$E^{(3)}{}_{sig} \propto |E_1||E_2||E_3|, \quad (13)$$

so that if $|E_1|$ and $|E_2|$ are roughly constant, then the Gaussian width across $W_f$ scales the magnitude of the stimulated emission generated by the third pulse C-2000.

The emitted polarization in the subject 100 can be approximated as a dipole source because the size of a single emitting block is much smaller than the wavelength of light. A dipole field with a carrier-wave wavelength of 800 nm, and a Gaussian temporal envelope that has a FWHM of 15 fs in the paraxial approximation can be simulated, where a spherical wave is represented by a complex quadratic phase. A 15 fs pulse duration is equivalent to a transition with 60 nm of bandwidth centered at 800 nm. The electric field in the spatial dimension with pulse front tilt, perpendicular to the optical axis as a function of time is calculated. To simulate what the signal will look like at the detector, the emitted dipole field is propagated through an f/2 optical imaging system using Fourier optics to simulate focusing the signal into the spectrometer and then perform the operations outlined mathematically above that simulate interferometric heterodyne detection with a 15 fs FWHM for the local oscillator pulses (LO) D-2000.

The results of this simulation, shown in FIG. 3, are calculated for a pair of emitters spaced by 275 nm. This separation satisfies the Rayleigh criterion for identifying distinct point sources. The image produced by the ORI simulation is plotted as the thick solid line in FIG. 3. The black lines 300 plotted in the figure correspond to where the expected peak centers are based on the simulation settings. FIG. 3 also shows the diffraction-limited image generated in these calculations.

The result in FIG. 3 demonstrates that ORI can resolve structures below the diffraction limit of the optics used in the experiment. As seen in FIG. 3 for f/2, diffraction-limited imaging only yields one feature, while ORI can resolve two features using these optics, spaced below the diffraction limit of f/0.5 optics. The limits placed on spatial resolution then become dependent upon the separation in time of the emitted signal from different parts of the subject 100 under study. In any real optical system, the physical optics cannot collect all possible steradians of an emitted signal. However, in ORI, if the signals are measurably separated in time, this will determine the resolution and not the numerical aperture of the collection optics. As such, for the simulation of the signal shown in FIG. 3, a smaller number of solid angles can be calculated and, because of the spacing of the emitted spherical waves in time, used to accurately measure the spacing of the two point emitters below the diffraction limit.

Thus, the proposed optical resonance imaging can overcome the diffraction limit of the optics used and offers the potential for super-resolution imaging. It is also possible to write a general equation that specifies the resolution of an image generated with ORI. Given the definition of pulse front tilt used above results in Equations (14) and (15):

$$pc = \tan\gamma = \frac{c \cdot T_f}{W_f}, \quad (14)$$

$$P = \frac{T_f}{W_f}, \quad (15)$$

where c is the speed of light, and $T_f$ and $W_f$ are defined in FIG. 2. To generate an image, the instrument must be able to distinguish between different points emitted by the subject 100 as a function of time. The maximum possible number of independent time points that can be measured across the emitted signal, N, can be written as Equation (16):

$$N = \frac{T_f}{\tau_s}, \quad (16)$$

where $\tau_s$ is the FWHM of the signal. This is true as long as the pulse duration of the local oscillator pulses (LO) D-2000 is as short or shorter than the temporal duration of the emitted signal. Since different portions of the subject 100 emit at different times, the lateral spatial resolution ($l_r$) of the experiment can then be thought of as the number of independent points measured across the focused spot size, as shown in FIG. (17):

$$l_r = \frac{W_f}{N} = \frac{W_f \tau_s}{T_f}. \quad (17)$$

Additionally, Equation (15) can be used to find lateral spatial resolution as set forth in Equation (18) below:

$$l_r = \frac{\tau_s}{p}. \quad (18)$$

The result in Equation (18) shows that the resolution in an ORI experiment only depends upon the pulse front tilt applied and the temporal duration of the subject 100 response (put equivalently, the emission bandwidth of the subject 100). As such the resolution of an ORI image will improve with larger pulse front tilt and faster subject 100 response. For the results discussed in this work, using f/0.5 optics to generate angle of γ substantially equal to 87 degrees produces a pulse front tilt of 0.0636 fs·nm$^{-1}$. For a value of $\tau_s$=15 fs, a resolution of 240 nm, independent of the wavelength of the light is found.

The value of p in Equation (18) is the pulse front tilt of the emitted signal. This result is derived assuming that the pulse front tilt of the third pulse C-2000 is equal to the pulse front tilt of the emitted signal. The above result is quite general, implying that the pulse front tilt of the signal is independent of the method in which pulse front tilt is delivered to the subject 100. This presents opportunities to significantly improve the resolution if systems generating significant pulse front tilt of the emitted signal are used.

Excitons generated by the absorption of photons are routinely studied with nonlinear spectroscopy, however they cannot be imaged directly because traditional techniques are unable to achieve the requisite spatio-temporal resolution. Excitation imaging with ultrafast temporal resolution offers new insights into the process of energy transfer and offers a tool to design and control how energy moves through materials.

Most experiments that can measure dynamics on femtosecond-to-nanosecond timescales remain diffraction-limited. Some recent work has demonstrated super-resolution pump-probe microscopy; however, such techniques are still limited to raster scanning a beam across the subject 100 to generate an image. In comparison, the proposed ORI system generates a widefield image since different parts of the subject 100 emit at different times and contribute to different parts of the image. Resolution is thus decoupled from wavelength and is determined by the bandwidth of the emitter and pulse front tilt emitted by the subject 100.

A single ORI experiment to extract spatial information from the subject 100 can be performed for fixed time intervals, τ, T, and $t_R$. In this fashion, each acquisition will have temporal resolution on the order of the pulse-front tilt (ps), while a series of images has temporal resolution limited by the length of the untilted pulse (e.g., 15 fs) or the molecular response function, whichever is longer. Changing the waiting time changes the population evolution, analogously to pump-probe spectroscopy (or microscopy). Instead of looking at spectral changes, the proposed ORI system images the changes in the subject 100. An optomechanical delay line can be used to control T out to the nanosecond regime or beyond.

In certain embodiments, the ORI system can be used to spectroscopically resolve the input and output energy. In one implementation, ORI is a third-order nonlinear system. Therefore, the timing between all three pulses (the first pulse A-2000, the second pulse B-2000, and the third pulse C-2000) can be experimentally controlled such that a complete measurement of the ORI response function $R^{(3)}$(τ, T, $t_R$) will also contain spectral information. The ability to vary the time between the first pulse A-2000 and the second pulse B-2000 is a degree of freedom unavailable in pump-probe microscopy, and Fourier transforming along this coordinate can produce spectral information along the "pump" axis in the same way as two-dimensional electronic spectroscopy. In addition, the heterodyne-detected data in the frequency domain produces the spectral information contained in the signal. Assignment of different spectral features is possible from two-dimensional electronic spectroscopy, and when combined with this extra experimental handle, optical resonance imaging thus correlates the input energy with the final position and energy of the exciton.

Kostenbauder simulation of an embodiment of the third pulse C-2000 is described below. The Kostenbauder matrix as defined in Equation (2) can be used to calculate how a variety of different optical elements affect the propagation of a Gaussian beam. Mirrors and distance propagators are defined in the same way as ABCD matrices with terms E, F, G, H, and I (as defined in Equation (2)) equal to zero, since mirrors and lenses do not generate spatio-temporal couplings. A diffraction grating is represented as Equation 19:

$$g = \begin{pmatrix} -\frac{\sin\phi}{\sin\psi} & 0 & 0 & 0 \\ 0 & -\frac{\sin\psi}{\sin\phi} & 0 & \lambda\frac{\cos\phi - \cos\psi}{c\sin\phi} \\ \frac{\cos\psi - \cos\phi}{c\sin\phi} & 0 & 1 & 0 \\ 0 & 0 & 0 & 1 \end{pmatrix}, \quad (19)$$

where ψ and φ are the input and output angles defined relative to the grating surface in the same way as in reference.

The electric field of a Gaussian beam can be described in terms of Q-matrices such that (Equation (20)):

$$E(x, t) = \exp\left[-i\frac{\pi}{\lambda_0}\begin{pmatrix} x \\ -t \end{pmatrix}^T Q^{-1} \begin{pmatrix} x \\ t \end{pmatrix}\right]. \quad (20)$$

The initial Q-matrix, $Q_{in}$ is given by Equation (21):

$$Q_{in} = i\frac{\lambda_0}{\pi}\begin{pmatrix} \tilde{Q}_{xx} & \tilde{Q}_{xt} \\ \tilde{Q}_{tx} & \tilde{Q}_{tt} \end{pmatrix}^{-1}, \quad (21)$$

where (Equation (22)):

$$\tilde{Q}_{xx} = -i\frac{\pi}{\lambda_0 R(z)} - \frac{1}{w(z)^2}, \quad (22)$$

$$\tilde{Q}_{tt} = \frac{1}{\tau_i^2}, \quad (23)$$

and the off-diagonal terms are zero since the pulse begins with no spatio-temporal coupling. In the above equations, $\lambda_0$ is the center wavelength, R(z) is the radius of curvature, $w^2(z)$ is the beam radius, β is the spatial chirp, and $\tau_i$ is the temporal FWHM of the pulse, and there is no spatial chirp in the initial beam. The Kostenbauder matrix representing the optical system can be found by taking the product of the optical elements as shown in Equation (24):

$$K=d_3l_3d_3l_2d_2gd_1l_1, \quad (24)$$

where l denotes a focusing optic (e.g., lens) operator, d a distance propagation operator, and g the grating operator. Given $Q_{in}$ and the matrix K, one can calculate Equation (25):

$$Q_{sample} = \left[ \begin{pmatrix} A & 0 \\ G & 1 \end{pmatrix} Q_{in} + \begin{pmatrix} B & \frac{E}{\lambda_0} \\ H & \frac{I}{\lambda_0} \end{pmatrix} \right] \left[ \begin{pmatrix} C & 0 \\ 0 & 0 \end{pmatrix} Q_{in} + \begin{pmatrix} D & \frac{F}{\lambda_0} \\ 0 & 1 \end{pmatrix} \right]^{-1}. \quad (25)$$

The value calculated for $Q_{sample}$ can be fed into Equation (20) to calculate the electric field at the sample. The data plotted in FIG. 2 are the intensity of the electric field, $|E(x,t)|^2$. The specific choices of values for the simulation plotted in FIG. 2 can be found in the table set forth in FIG. 5. In the FIG. 5 table, a) represents spacing between lines on diffraction grating, b) represents $\theta_{in}$ and $\theta_{out}$ for diffraction gratings defined relative to grating normal, and c) or f in this context denotes the focal length of the lens or other focusing optic.

Simulation of an emitted signal was also performed. All calculations of the emitted signal were performed using the software MATLAB R2015a. Alternatively, different software may also be used. The emitted third-order signal, $E^{(3)}_{sig}$, was modeled as a spherical wave that results from a single dipole emitter. The approximation necessary for the use of Fourier optics was chosen, where a spherical wave can be represented by a quadratic phase term that approximates the spherical wavefronts as parabolic. In addition, since the pulse-front tilt is only in one spatial dimension, x, the electric field is calculated in the x-dimension perpendicular to the direction of propagation, which is defined as z. The signal has a carrier frequency of 375 THz (center wavelength of 800 nm) and a Gaussian temporal envelope with a FWHM of 15 fs. As such, the signal from a given dipole can be written as Equation (26):

$$E^{(3)}_{sig}(x,z,t) = \quad (26)$$
$$\left( \frac{d \cdot k^2}{4\pi\epsilon_0} \right) e^{i\frac{k(x-\eta)^2}{2z}} e^{-i\omega(t+t')} e^{-\left(\frac{z}{c}-(t+t')\right)^2/2\left(\frac{\tau_{mol}}{2.35482}\right)^2} e^{-(x)^2/2\left(\frac{W_f,FWHM}{2.35482}\right)^2},$$

where d is the dipole moment and k is the wavevector, z is the position along the optical axis of the system, and t' is the time of dipole emission as determined by the pulse-front tilt. The origin of the x-axis is centered about the axis defined by z, and η corresponds to the distance of the dipole emitter from the optical axis. The last term accounts for the Gaussian nature of the spatial illumination of the sample by Pulse 3. Pulse-front tilt leads to emission of different parts of the sample at different times. The emission of the first dipole at a given point in the material starts at a given time, t'=0, and one calculates its $E^{(3)}_{sig}$ as a function of x and t for a fixed value of $z=z_{obs}$. The next dipole to emit is delayed in time from the first by (Equation (27)):

$$t' = \frac{x}{c}\tan\gamma. \quad (27)$$

The time spacing between points in the simulation is 0.01 fs, and the spatial extent of x corresponds to the size of the aperture of f/0.5 optics illuminated by the Gaussian beam plotted in FIG. 2. To simulate imaging this field into a spectrometer, one can model an optical system with f/2 optics, which utilizes 2 focusing optics (e.g., lenses) of focal length f, spaced by 2 f Equation (26) is used to calculate the electric field directly behind the first focusing optic of the imaging system and the field is calculated at the front focal plane of the second focusing optic, where the image forms using Fourier optics in the Fresnel approximation. The image forms on the input slit of a spectrometer that will be used to measure the emitted interferogram of $E^{(3)}_{sig}(x, z, t)$ with $E_{LO}$.

Taking $E^{(3)}_{sig}(x, z, t)$ as the input field of the Fourier optics, $U_{in}$, one can write an operator, $\hat{S}$, to model the optical system and calculate $U_{out}$, the output field, as shown in Equation (28):

$$U_{out} = \hat{S}U_{in} = F^{-1}Q[-\lambda^2 f]FQ\left[\frac{-1}{f}\right]F^{-1}Q[-\lambda^{22}f]FQ\left[\frac{-1}{f}\right]U_{in}, \quad (28)$$

where F is a spatial Fourier transform, Q is a quadratic phase operator as defined by Goodman, and the values in brackets are the input arguments for the operator. All Fourier transforms are calculated numerically using the fast-Fourier transform (FFT) algorithm in Matlab (or other software). To simulate the effect of the spectrometer an FFT was performed along the temporal dimension of $U_{out}$ and then sum down the spatial dimension. Since the imaging system is diffraction limited, there is no additional spatial information along this axis. Equivalently, one could have used just one line from the calculated array, representing a one-dimensional array of pixels on a detector. The LO signal is calculated using a carrier wavelength of 800 nm and τ=15 fs FWHM, and the FFT of the LO is multiplied by the summed FFT of $U_{out}$. Measured electric fields are real valued, so only the real part of the product defined in Equation (8) was kept. Still in the frequency domain, the position of the interferogram was shifted so that the peak is centered around zero frequency to remove any high-frequency contributions to the image.

Figure 4:
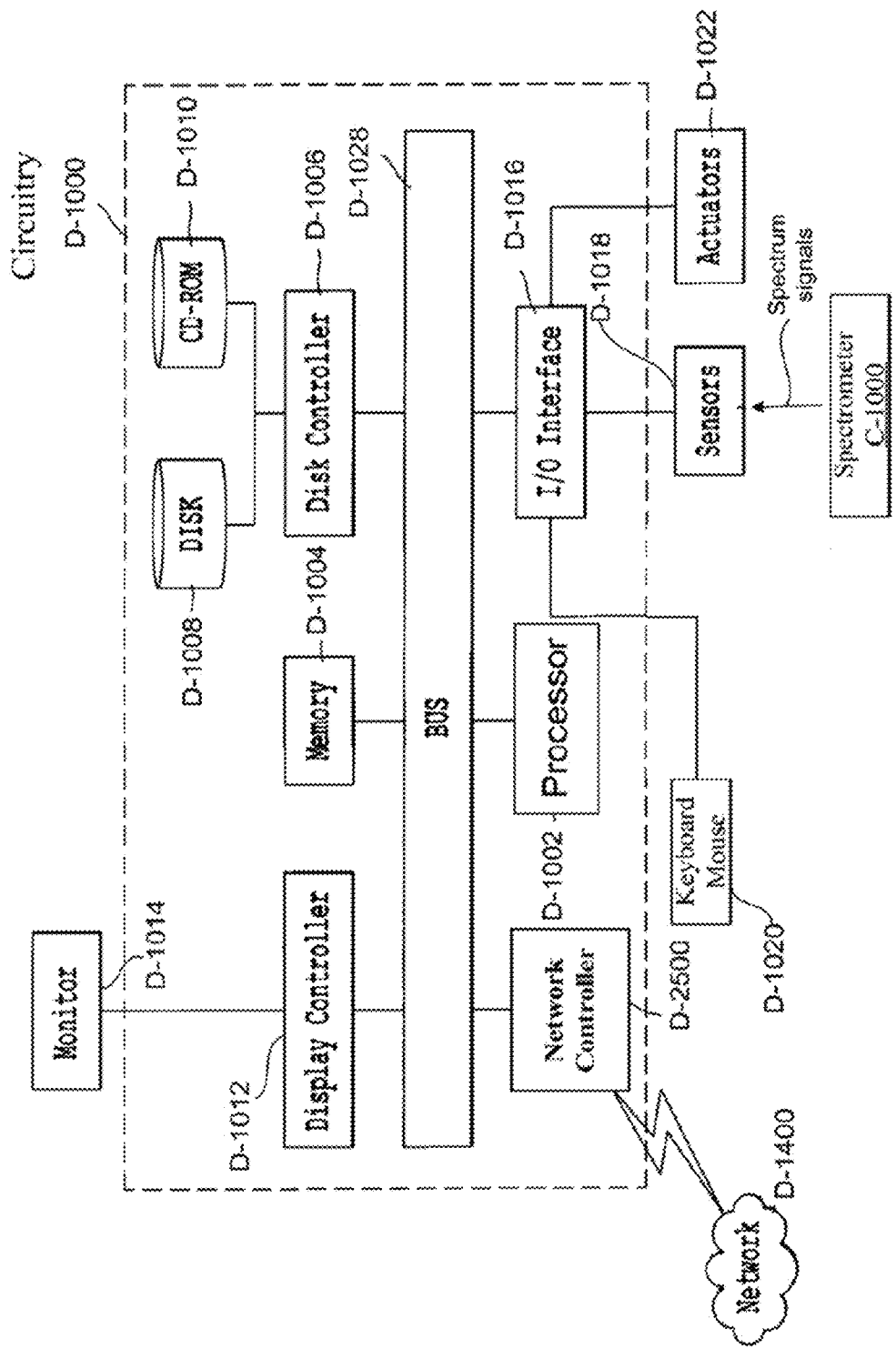
FIG. 4 is a schematic view of a hardware diagram of circuitry of the ORI system to realize personalized cosmetic compositions in accordance with an illustrative embodiment.

Finally, the inverse FFT was taken and the magnitude of the complex signal plotted as the image in FIG. 3. FIG. 4 depicts the electronic control unit D-1000 to control the system. As shown in FIG. 4, systems, operations, and processes in accordance with this disclosure may be implemented using a processor D-1002 or at least one application specific processor (ASP). The processor D-1002 may utilize a computer readable storage medium, such as a memory D-1004 (e.g., ROM, EPROM, EEPROM, flash memory, static memory, DRAM, SDRAM, and their equivalents), configured to control the processor D-1002 to perform and/or control the systems, operations, and processes of this disclosure. Other storage mediums may be controlled via a disk controller D-1006, which may control a hard disk drive D-1008 or optical disk drive D-1010.

The processor D-1002 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor D-1002 may be a separate device or a single processing mechanism. Further, this disclosure may benefit from parallel processing capabilities of a multi-cored processor.

In another aspect, results of processing in accordance with this disclosure may be displayed via a display controller D-1012 to a monitor D-1014 that may be peripheral to or part of the electronic control unit D-1000. Moreover, the monitor D-1014 may have a touch-sensitive interface to a command/instruction interface. The display controller D-1012 may also include at least one graphic processing unit for improved computational efficiency. Additionally, the electronic control unit D-1000 may include an I/O (input/output) interface D-1016, for inputting sensor data from sensors D-1018 and for outputting orders to actuators D-1022. The sensors D-1018 and actuators D-1022 are illustrative of any of the sensors and actuators described in this disclosure. For example, one of the sensors D-1018 can be the spectrometer C-1000.

Further, other input devices may be connected to an I/O interface D-1016 as peripherals or as part of the electronic control unit D-1000. For example, a keyboard or a pointing device such as a mouse D-1020 may be used to control parameters of the various processes and algorithms of this disclosure, and may be connected to the I/O interface D-1016 to generate additional functionality and configuration options, or to control display characteristics. Actuators D-1022 which may be embodied in any of the elements of the apparatuses described in this disclosure may also be connected to the I/O interface D-1016.

The above-noted hardware components may be coupled to the network D-1400, such as the Internet or a local intranet, via the network controller D-2500 for the transmission or reception of data, including controllable parameters and/or images/data to another computing device such as a smart phone, a tablet, a laptop computer, a database, a desktop computer, etc. A central BUS D-1028 may be included to connect the above-noted hardware components together, and to allow at least one path for digital communication there between.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to an "embodiment" means that a particular feature, structure, characteristic, operation, or function described in connection with an embodiment is included in at least one embodiment of the disclosed subject matter. Thus, any appearance of the phrases "embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration, orientation, or ordering.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

What is claimed is:

1. An optical resonance imaging system, comprising:
a light emitting device to emit laser pulses onto a subject, wherein the laser pulses include:
a first pulse and a second pulse to place the subject in an excited state; and
a third pulse to stimulate emission of one or more third order signals from the subject;
a spectrometer to receive the one or more third order signals and generate spectrum signals commensurate with intensities of the one or more third order signals; and
first circuitry configured to:
analyze the spectrum signals;
generate one or more images of the subject based on the analysis; and
construct one or more maps that identify positions of the subject based on the one or more images and based on emission times of the one or more third order signals.

2. The system of claim 1, wherein the system includes second circuitry configured to isolate the one or more third order signals from excitation signals generated by the subject.

3. The system of claim 1, wherein the system includes second circuitry configured to measure arrival times of the one or more third order signals.

4. The system of claim 3, further comprising a local oscillator that emits reference pulses to measure the arrival times of the one or more third order signals.

5. The system of claim 1, wherein the light emitting device further includes an optical tilt system that generates the third pulse with a pulse front tilt.

6. The system of claim 5, wherein the optical tilt system includes a pulse shaper that generates spatial chirp beams and a dispersive medium to receive the spatial chirp beams and generate the pulse-front tilt.

7. The system of claim 5, wherein the optical tilt system includes at least one of a grating, a plurality of gratings, a prism, a plurality of prisms, a grism, and a plurality of grisms.

8. The system of claim 7, wherein the at least one of the grating, the plurality of gratings, the grism, and the plurality of grisms has a line density between 1000 lines/mm and 4000 lines/mm.

9. The system of claim 7, further comprising an optical stretcher and an optical compressor, wherein the system uses the optical stretcher and the optical compressor in tandem to provide an ultrafast duration of the third pulse with the pulse front tilt.

10. The system of claim 7, further comprising one half of an optical stretcher and one half of an optical compressor, wherein the system uses the one half of the optical stretcher and the one half of the optical compressor in tandem to provide an ultrafast duration of the third pulse with the pulse front tilt.

11. The system of claim 1, wherein the light emitting device further includes a 4f imaging system to focus the laser pulses onto the subject.

12. A method of optical resonance imaging, the method comprising:
   emitting, by a light emitting device, a first pulse and a second pulse onto a subject to place the subject in an excited state;
   emitting, by the light emitting device, a third pulse onto the subject to stimulate emission of one or more third order signals from the subject;
   receiving, by a spectrometer, the one or more third order signals from the subject;
   generating, by the spectrometer, spectrum signals commensurate with intensities of the one or more third order signals;
   analyzing, by circuitry in communication with the spectrometer, the spectrum signals;
   generating, by the circuitry, one or more images of the subject based on the analysis; and
   constructing, by the circuitry, one or more maps that identify positions of the subject based on the one or more images and based on emission times of the one or more third order signals.

13. The method of claim 12, further comprising:
   emitting, by a local oscillator, reference pulses; and
   measuring, by the circuitry, arrival times of the one or more third order signals based at least in part on the reference pulses.

14. The method of claim 12, further comprising generating, by an optical tilt system of the light emitting device, the third pulse with a pulse front tilt.

15. The method of claim 14, further comprising:
   generating, by a pulse shaper of the optical tilt system, spatial chirp beams;
   receiving the spatial chirp beams in a dispersive medium of the optical tilt system; and
   generating the third pulse with pulse-front tilt based at least in part on the received spatial chirp beams.

16. The method of claim 14, wherein the optical tilt system includes at least one of a grating, a plurality of gratings, a prism, a plurality of prisms, a grism, and a plurality of grisms.

17. The method of claim 16, further comprising using an optical stretcher and an optical compressor in tandem to provide an ultrafast duration of the third pulse with the pulse front tilt.

18. The method of claim 16, further comprising using one half of an optical stretcher and one half of an optical compressor in tandem to provide an ultrafast duration of the third pulse with the pulse front tilt.

* * * * *